United States Patent [19]
Winter

[11] Patent Number: 5,123,009
[45] Date of Patent: Jun. 16, 1992

[54] METHOD AND APPARATUS FOR DISABLING AN ECHO CANCELLER

[75] Inventor: Stephen J. Winter, Sunrise, Fla.

[73] Assignee: Racal Data Communications Inc., Sunrise, Fla.

[21] Appl. No.: 604,695

[22] Filed: Oct. 26, 1990

[51] Int. Cl.⁵ .................... H04J 1/00; H04J 3/00; H04J 3/06

[52] U.S. Cl. .................... 370/32.1; 370/100.1; 370/103; 379/407

[58] Field of Search ............ 370/32.1, 32, 100.1, 370/103, 105.1, 105.4, 110.1, 110.2, 110.3, 67; 375/109, 106, 114, 118; 379/102, 105, 93, 407, 408; 340/825.48

[56]  References Cited

U.S. PATENT DOCUMENTS

| | | | |
|---|---|---|---|
| 4,227,248 | 10/1980 | Munter | 370/110.2 |
| 4,352,962 | 10/1982 | LaMothe | 379/407 |
| 4,658,420 | 4/1987 | Fukushi et al. | 379/407 |
| 4,757,521 | 7/1988 | Korsky et al. | 370/103 |
| 4,773,065 | 9/1988 | Kobayashi et al. | 370/67 |
| 4,797,898 | 1/1989 | Martinez | 375/7 |
| 4,881,221 | 11/1989 | Schroeder et al. | 370/32.1 |
| 4,890,303 | 12/1989 | Bader | 375/109 |
| 4,945,533 | 7/1990 | Schroeder et al. | 370/32.1 |
| 5,014,307 | 5/1991 | Joffe et al. | 370/32.1 |

Primary Examiner—Stephen Chin
Assistant Examiner—H. Kizou

[57] ABSTRACT

A method and apparatus for disabling an echo canceller in a digital telephone network. An originating DSU transmits a sequence of synchronization codes which are shifted by the various delays in the network. The answering DSU receives the shifted codes and determines how much adjustment is required by the originating modem in order to have byte boundaries aligned with those of the network. The answering DSU then transmits this information back to the originating DSU so that the originating DSU can adjust its transmit time to align with the byte boundaries of the network. The originating DSU then transmits byte aligned 2100 Hz tone samples in order to disable the network's echo canceller.

19 Claims, 9 Drawing Sheets

METHOD AND APPARATUS FOR DISABLING AN ECHO CANCELLER

BACKGROUND

1. Field of the Invention

This invention relates generally to the field of digital data communications over digital telecommunications lines. More particularly, this invention relates to a method and apparatus for transmission of byte-organized data to a receiving station that may employ byte boundries different than those of the transmitting station. For example, the present invention may be used for disabling an echo canceller in a long distance telephone line used for data communication.

2. Background of the Invention

Echo cancellers are frequently used in long distance telephone lines such as those provided by U.S. SPRINT Corp. and other long distance carriers to improve the intelligibility of voice communications. Echoes are caused by mismatches in impedance (generally at hybrid transformers) coupled with delays. Although it is desirable to eliminate these in voice communication, the presence of an echo canceller in a bit-synchronous digital network results in numerous data errors.

U.S. Pat. No. 4,945,533 and U.S. Pat. No. 4,881,221 both describe a method and apparatus for disabling the echo canceller by sequentially transmitting all possible variations of a signal used to disable the echo canceller for each possible byte alignment of the network during a call setup period. These patents are hereby incorporated by reference.

The present invention provides a systematic method and apparatus to solve the problem of disabling the echo canceller by determining the proper alignment to the byte boundaries of the digital network and transmitting a predetermined signal with the proper byte boundaries to disable the echo canceller. The present invention can also be used in communicating with the network for, for example, control purposes when such communications are required to be aligned with byte boundries.

SUMMARY OF THE INVENTION

It is an object of the present invention to provide a method and apparatus for alignment to the byte boundaries of a digital network in order to disable an echo canceller.

It is a feature that the present invention to provides a systematic approach to such alignment.

These and other objects, advantages and features of the invention will become apparent to those skilled in the art upon consideration of the following description of the invention.

In one embodiment of the present invention a digital data communication network having an echo canceller situated in a portion thereof, a method for disabling the echo canceller so that the echo canceller will not interfere with transmission of digital signals over the network, the method includes the steps of: at an originating station, transmitting a digital synchronization byte to an answering station; at the answering station, receiving the synchronization byte and comparing the synchronization byte with a known network byte boundary; at the answering station, determining an offset required to align the synchronization byte with the known network byte boundary and transmitting the offset in the form of an offset signal to the originating station; at the originating station, receiving the offset signal and adjusting transmission time of transmitted bytes transmitted by the originating station so that the network byte boundary aligns with the transmitted byte boundaries when the transmitted bytes are received by the answering station and the network; and at the originating station, transmitting an echo canceller disabling signal in byte alignment with the network to disable the echo canceller.

In another embodiment, a digital data communication network having an echo canceller situated in a portion thereof, a method for disabling the echo canceller so that the echo canceller will not interfere with transmission of digital signals over the network, the method includes the steps of: transmitting a digital synchronization byte from an originating station to an answering station; receiving an offset signal from the answering station and adjusting transmission time of transmitted bytes transmitted by the originating station so that the network byte boundary aligns with the transmitted byte boundaries when the transmitted bytes are received by the answering station and the network; and transmitting an echo canceller disabling signal in byte alignment with the network to disable the echo canceller.

In another digital data communication network, a method for determining byte boundaries of the network, the method includes the steps of: receiving a synchronization byte from an originating station and comparing the synchronization byte with a known network byte boundary; determining an offset required to align the synchronization byte with the known network byte boundary; and transmitting the offset in the form of an offset signal to the originating station.

A telecommunication system according to the present invention includes a bit-synchronous digital transmission circuit having byte boundaries. An echo canceller is coupled to the transmission circuit. The echo canceller is disabled by to a predetermined disable signal received in synchronous data frames. The location in time of the byte boundaries of the circuit are ascertained and the disable signal is transmitted to the echo canceller in synchronous data frames using these byte boundaries.

A telecommunication system according to the preferred embodiment of the present invention includes a bit-synchronous digital transmission circuit having byte boundaries. An echo canceller is coupled to the transmission circuit. The echo canceller is disabled by receipt of a predetermined disable signal received in synchronous data frames. The location in time of the byte boundaries of the circuit are located by transmitting a synchronization signal from a first station to a second station. The second station makes a determination of the byte boundaries by comparison of the synchronization signal with a reference, and transmits a one byte offset signal from the second station to the first station for adjusting the byte boundaries of bytes transmitted by the first station. The determination is made by finding the number of bit times difference between a known receive byte boundary and the transmitted byte boundary of the synchronization signal. A transmitter transmits the disable signal, comprising a sequence of digital samples of a 2100 Hz tone, to the echo canceller in synchronous data frames using the byte boundaries. The transmitter retrieves the sequence of digital samples from a memory table 30 consecutive times. This table includes 80 samples from 21 cycles of the 2100 Hz tone.

A method and apparatus for disabling an echo canceller in a digital telephone network includes an originating DSU which transmits a sequence of synchronization codes which are shifted by the various delays in the network. The answering DSU receives the shifted codes and determines how much adjustment is required by the originating modem in order to have byte boundaries aligned with those of the network. The answering DSU then transmits this information back to the originating DSU so that the originating DSU can adjust its transmit time to align with the byte boundaries of the network. The originating DSU then transmits byte aligned 2100 Hz tone samples in order to disable the network's echo canceller.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
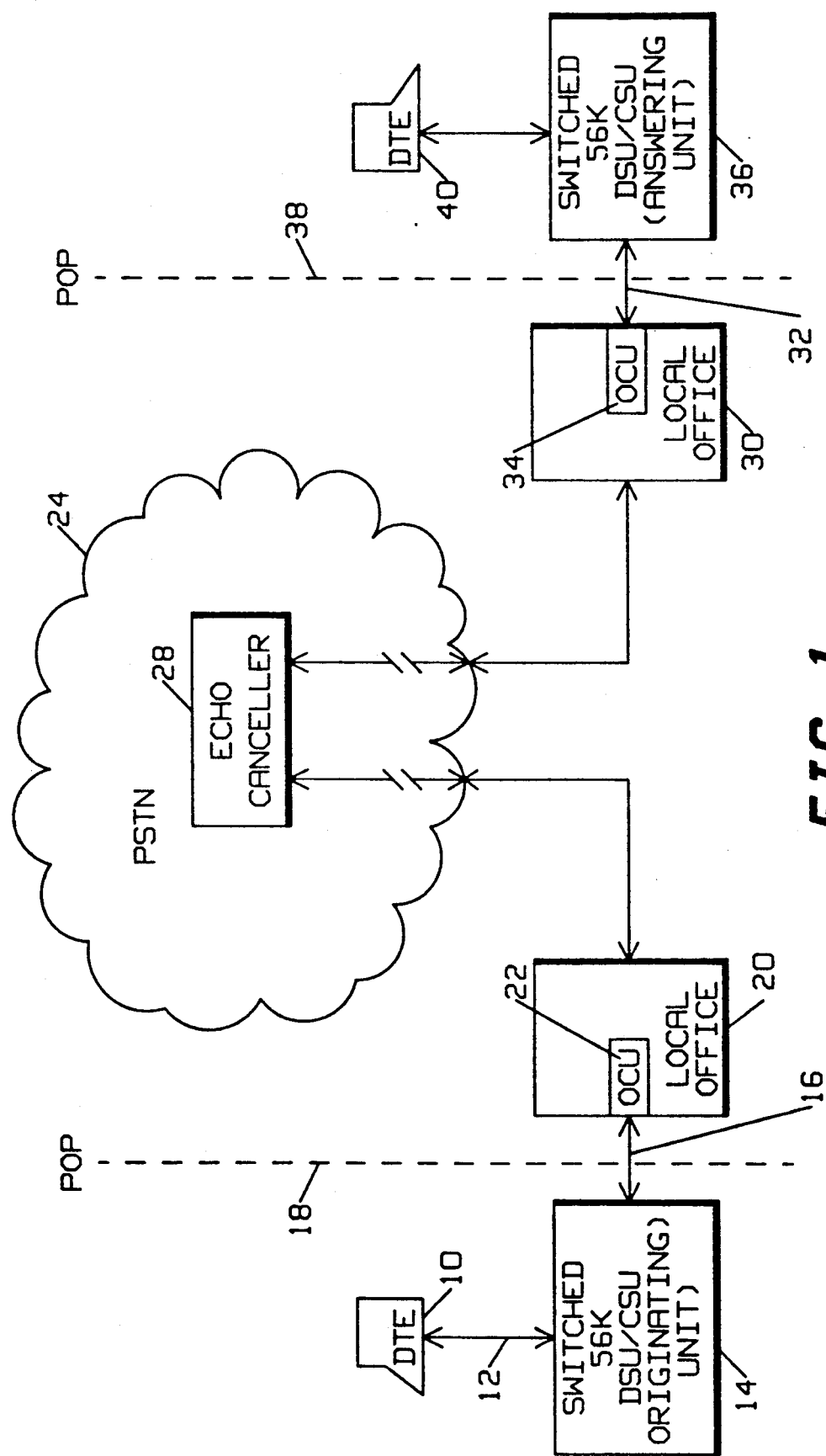
FIG. 1 shows an example data communications network illustrating the overall operation of the present invention.

Turning now to FIG. 1, an illustrative network which utilizes the present invention is shown. In this example network, a terminal or other DTE (Data Terminal Equipment) is coupled via, for example an RS-232, connection 12 to a digital access device 14. Device 14 may be, for example, a combination DSU/CSU (Digital Service Unit / Customer Service Unit), often referred to simply as a DSU.

For purposes of this example, DSU 14 will be considered the call originating unit. DSU 14 is coupled via a local loop connection 16 through a point of presence (POP) 18 to a local office 20. Local office 20 has its own internal OCU (Office Channel Unit) 22 and provides access to a long distance connection via a PSTN (Public Switched Telephone Network) 24 provided by any of a number of long distance carriers. An echo canceller 28 forms a part of the PSTN 24 to provide cancellation of echo signals for voice communication over the long distance connection.

According to the present invention, it is desirable to disable this echo canceller if the network is being used to carry pure digital data in the form of discreet logic signals, as opposed to data encoded analog signals. In several networks this is accomplished by transmitting a 2100 Hz tone of adequate duration in accordance with CCITT recommendation G164 section 5. The problem associated with disabling the echo canceller is that the byte boundaries of the network are unknown to the DSU 14.

On the other side of the network, the PSTN 24 is coupled to another local office 30 which is connected via a local loop connection 32 attached to its office channel unit OCU 34 to an answering side DSU 36 on the other side of the POP 38. The answering side DSU 36 is coupled to an answering side DTE 40. Those skilled in the art will appreciate that other network configurations are possible with the present invention.

Figure 2A:
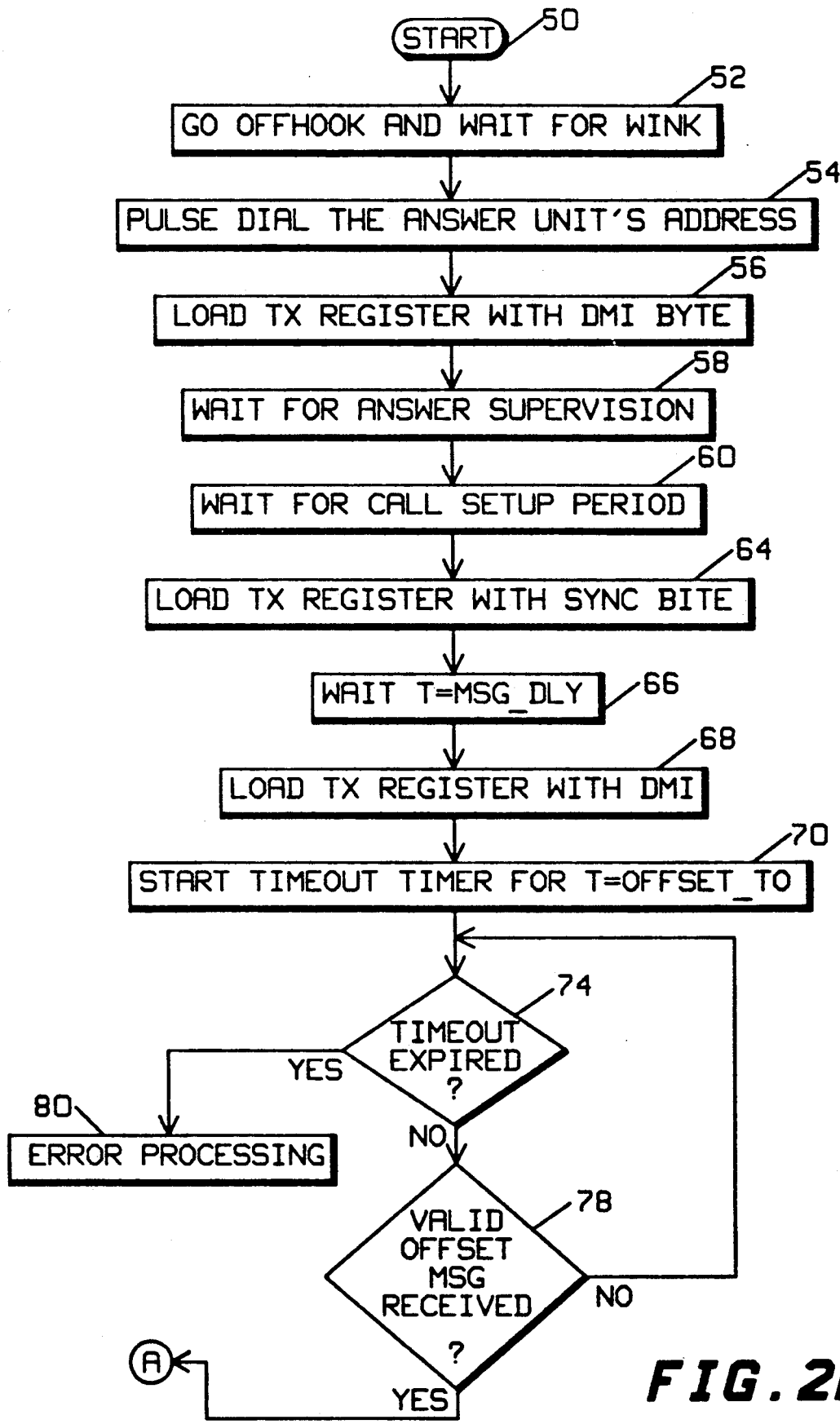
FIGS. 2A and 2B describe the operation of the originating unit in flow chart form.
Figure 2B:
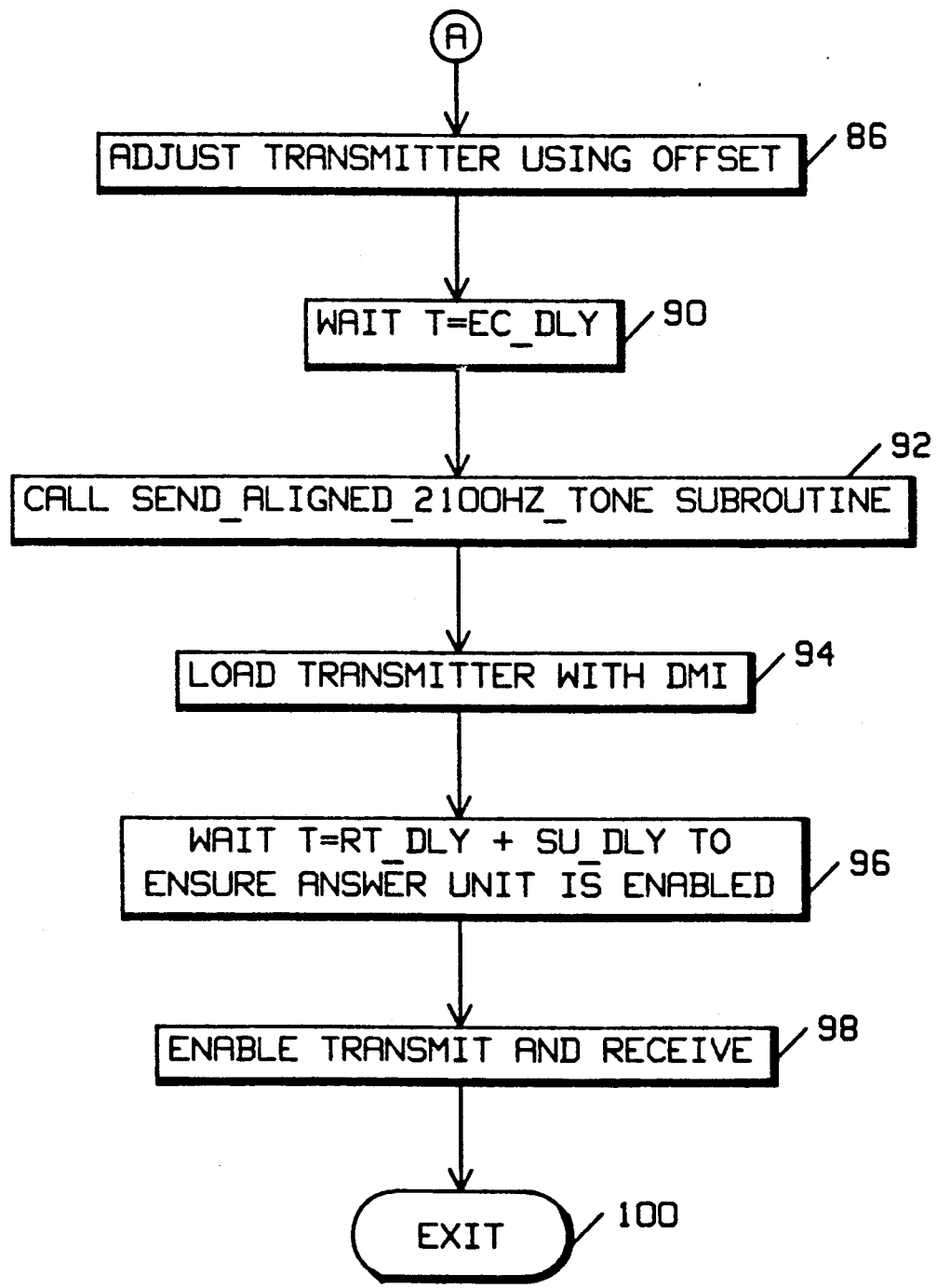

When the originating side DSU 14 initiates a call to the answering side DSU 36, the transmitting side DSU follows the process described in conjunction with the flow chart of FIG. 2 according to the present invention. This flow chart describes the process of disabling the echo canceller after ascertaining the proper byte alignment of the network and starts at step 50. At step 52, the originating DSU 14 goes off hook and waits for a Wink signal from the network, which is analogous to receiving a dial tone in an analog network. Upon receipt of the Wink signal at 52, the originating unit pulse dials the answering unit's address at 54.

A register is provided in the DSU 14 to hold the next byte of information to be transmitted to the PSTN 24. At step 56, this register is loaded with one word of Data Mode Idle (DMI) as defined by the network specification. The receiver of the originating unit 14 then waits for an answer supervision signal at 58. At this point, the DSU 14 waits for one call setup period (approximately 3.85 seconds in some networks) at step 60.

Following this call setup period wait, the DSU implements transmission of a synchronization word for a predetermined time period (approximately 10 ms in the preferred embodiment). A transmission level of approximately −16 dbm0 assuming a maximum level of +3 dbm0 is appropriate to disable the canceller. This is done by loading a transmit sync word (1000000 in the preferred embodiment) into the transmit register continuously for 10 ms at step 64 as set by a delay equivalent to the message delay (MSG_DLY) at step 66. This is done by waiting MSG_DLY=80 byte times at 125 microseconds / byte time=10 ms. Next the transmit register is loaded with DMI at 68 which is transmitted for a timeout offset period (OFFSET_TO) at step 70.

If this timeout period expires at step 74, without having received a valid offset message from the answering unit at step 78, then control passes to error handling routines at step 80. Otherwise, control passes to step where the transmitter offset received from the answering unit is used to adjust the transmitter timing at step 86 to obtain proper byte alignment with the network by adding a time offset to the starting time of transmitted data. The transmitter then waits for a period equal to the echo canceller delay (EC_DLY) at step 90 and then enters a subroutine for generating and transmitting a 2100 Hz tone at step 92 to disable the echo canceller. Of course, those skilled in the art will understand that any other appropriate echo canceller disablement signal could be used at this point without departing from the present invention.

Control then passes to step 96 where the transmit unit waits for a period of time adequate to assure that the answering unit 36 is enabled. In the preferred embodiment, this period is equal to the round trip delay (RT_DLY) plus the answering unit's setup delay (SU_DLY). The originating unit's transmitter and receiver are then enabled for transmission and reception of user data at step 98 and the routine terminates at 100.

Figure 3:
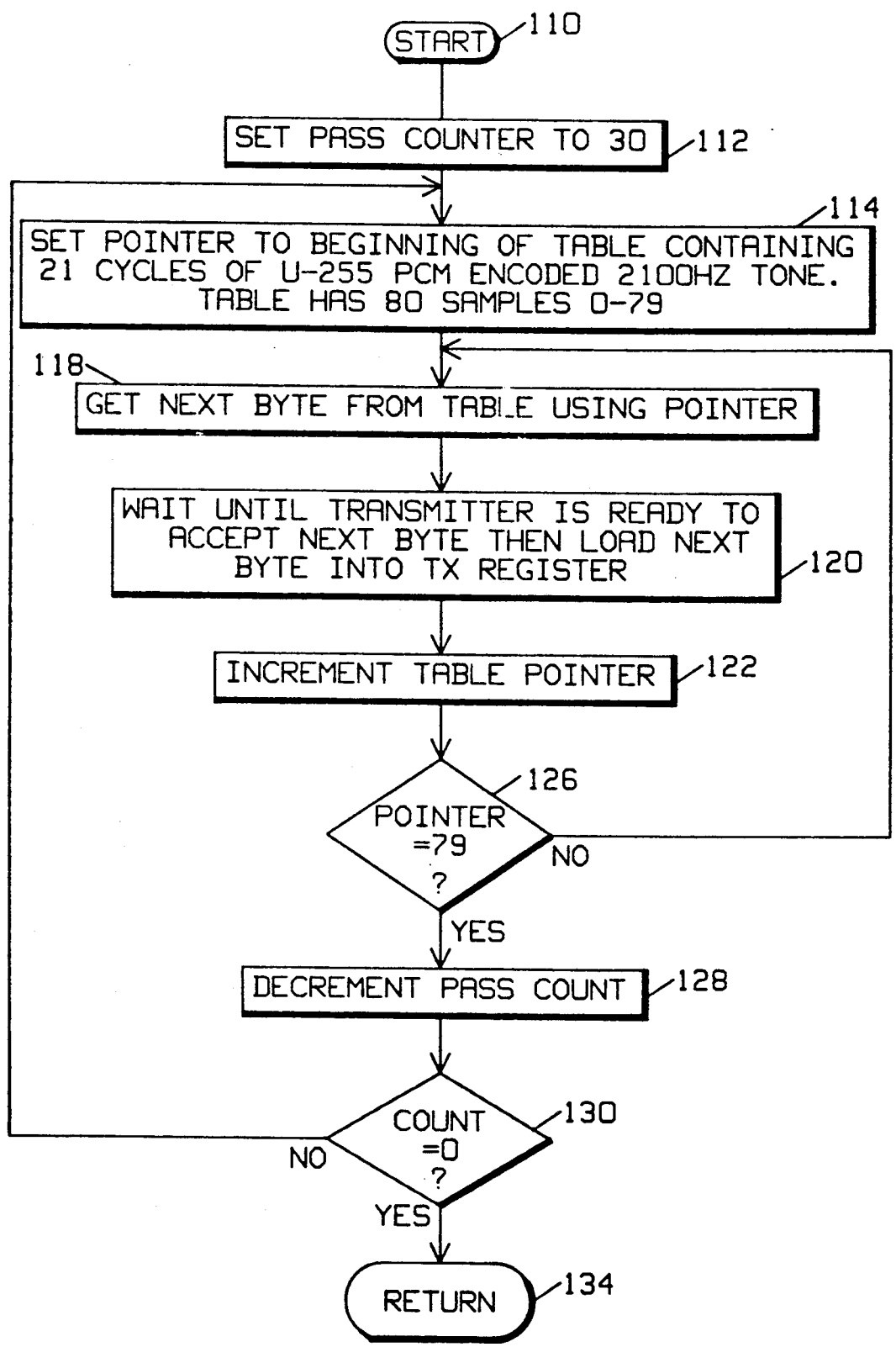
FIG. 3, describes the subroutine used to send the 2100 Hz tone as described in conjunction with FIG. 2

The subroutine of step 92 of FIG. 2 is shown in greater detail in FIG. 3 which enters at step 110. Six hundred thirty cycles of the 2100 Hz tone corresponds to a time which will meet or exceed the requirement for disabling the echo canceller in the preferred embodiment, so a pass counter is preset to 30 at step 112. A pointer is then set to the beginning of a table in memory containing samples of 21 cycles of the 2100 Hz tone to be transmitted. TABLE 1 below corresponds to the memory table used in the preferred embodiment. This table contains 80 samples of the tone sampled at 8 Khz sampling rate in the current embodiment, 0-79. The next sample byte is fetched at step 118. At 120, this next byte is loaded into the transmit register when the transmitter register is ready to accept the next byte. Then, the table pointer is incremented at step 122.

TABLE 1

| SAMPLE | HEX | BINARY |
|---|---|---|
| 0 | 75 | 1110101 |
| 1 | 46 | 1000110 |
| 2 | 74 | 1110100 |
| 3 | 73 | 0001101 |
| 4 | D | 0001101 |
| 5 | 22 | 0100010 |
| 6 | 4C | 1001100 |
| 7 | 7D | 1111101 |
| 8 | 2D | 0101101 |
| 9 | 5C | 1011100 |
| 10 | 1C | 0011100 |
| 11 | 6D | 1101101 |
| 12 | 36 | 0111101 |
| 13 | 4C | 1001100 |
| 14 | 2 | 0000010 |
| 15 | D | 0001101 |
| 16 | 53 | 1010011 |
| 17 | 74 | 1110100 |
| 18 | 6A | 1101010 |
| 19 | 75 | 1110101 |
| 20 | 7F | 1111111 |
| 21 | 74 | 1110100 |
| 22 | 6B | 1101011 |
| 23 | 75 | 1110101 |
| 24 | 52 | 1010010 |
| 25 | C | 0001100 |
| 26 | 3 | 0000011 |
| 27 | 4D | 1001101 |
| 28 | 3C | 0111100 |
| 29 | 6C | 1101100 |
| 30 | 1D | 0011101 |
| 31 | 5D | 1011101 |
| 32 | 2C | 0101100 |
| 33 | 7C | 1111100 |
| 34 | 4D | 1001101 |
| 35 | 23 | 0100011 |
| 36 | C | 0001100 |
| 37 | 72 | 1110010 |
| 38 | 75 | 1110101 |
| 39 | 47 | 1000111 |
| 40 | 74 | 1110100 |
| 41 | 47 | 1000111 |
| 42 | 75 | 1110101 |
| 43 | 72 | 1110010 |
| 44 | C | 0001100 |
| 45 | 23 | 0100011 |
| 46 | 4D | 1001101 |
| 47 | 7C | 1111100 |
| 48 | 2C | 0101100 |
| 49 | 5D | 1011101 |
| 50 | 1D | 0011101 |
| 51 | 6C | 1101100 |
| 52 | 3C | 0111100 |
| 53 | 4D | 1001101 |
| 54 | 3 | 0000011 |
| 55 | C | 0001100 |
| 56 | 52 | 1010010 |
| 57 | 75 | 1110101 |
| 58 | 6B | 1101011 |
| 59 | 74 | 1110100 |
| 60 | 7F | 1111111 |

TABLE 1-continued

| SAMPLE | HEX | BINARY |
|---|---|---|
| 61 | 75 | 1110101 |
| 62 | 6A | 1101010 |
| 63 | 74 | 1110100 |
| 64 | 53 | 1010011 |
| 65 | D | 0001101 |
| 66 | 2 | 0000010 |
| 67 | 4C | 1001100 |
| 68 | 3D | 0111101 |
| 69 | 6D | 1101101 |
| 70 | 1C | 0011100 |
| 71 | 5C | 1011100 |
| 72 | 2D | 0101101 |
| 73 | 7D | 1111101 |
| 74 | 4C | 1001100 |
| 75 | 22 | 0100010 |
| 76 | D | 0001101 |
| 77 | 73 | 1110011 |
| 78 | 74 | 1110100 |
| 79 | 46 | 1000110 |

Step 126 checks to see if the pointer has reached the end of the table, i.e. the pointer=79. If not, the routine returns to step 118 where the next byte is fetched from the table. If so, the pass counter is decremented by one at step 128 until the count equals zero at step 130. If the count does not equal zero, at 130, control returns to step 114 where the next pass of 80 samples is sequentially loaded into the transmit register. If the pass counter has reached zero at 130, the routine ends at 134.

Figure 4A:
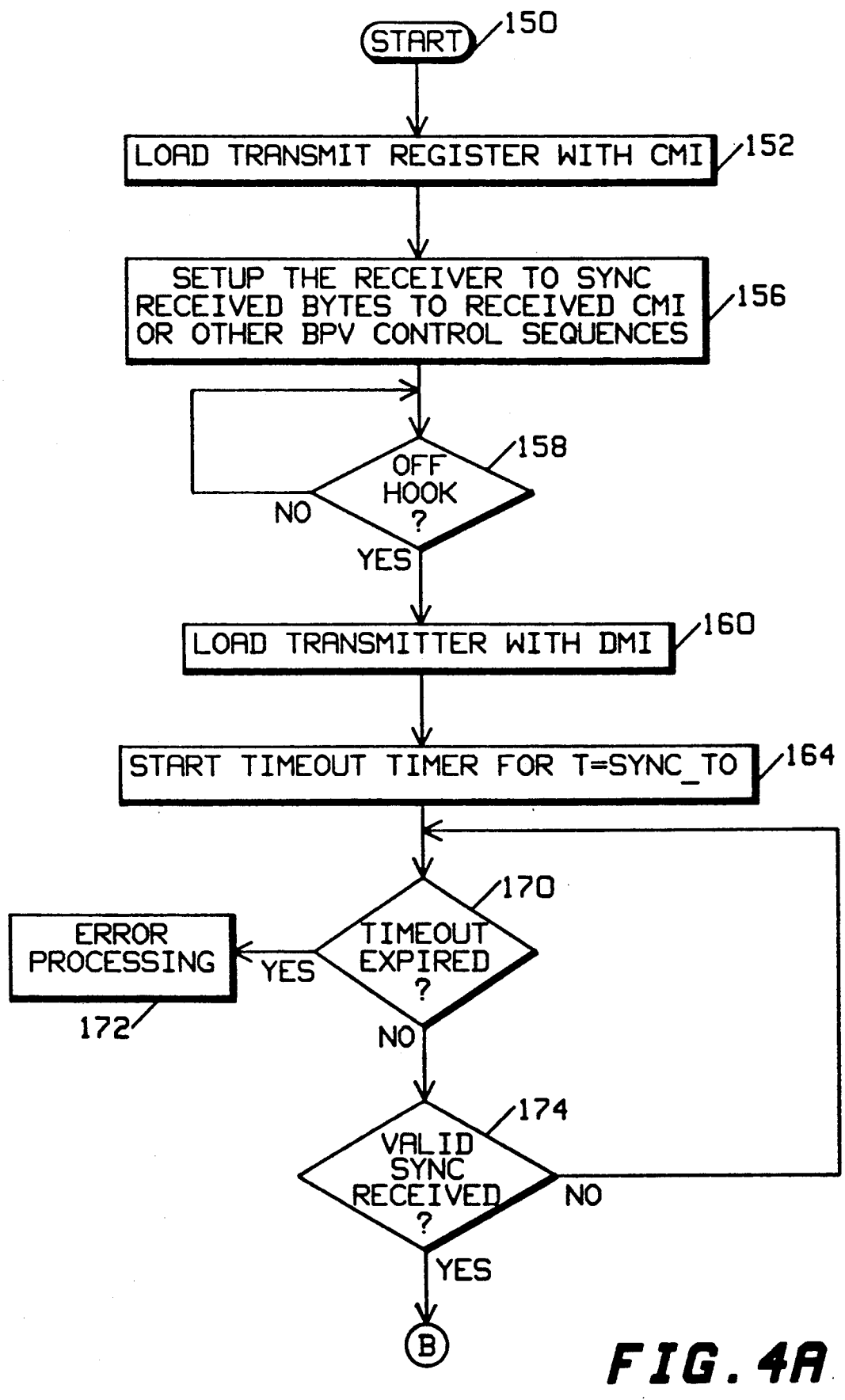
FIGS. 4A and 4B describe the operation of the answering unit in flow chart form.
Figure 4B:
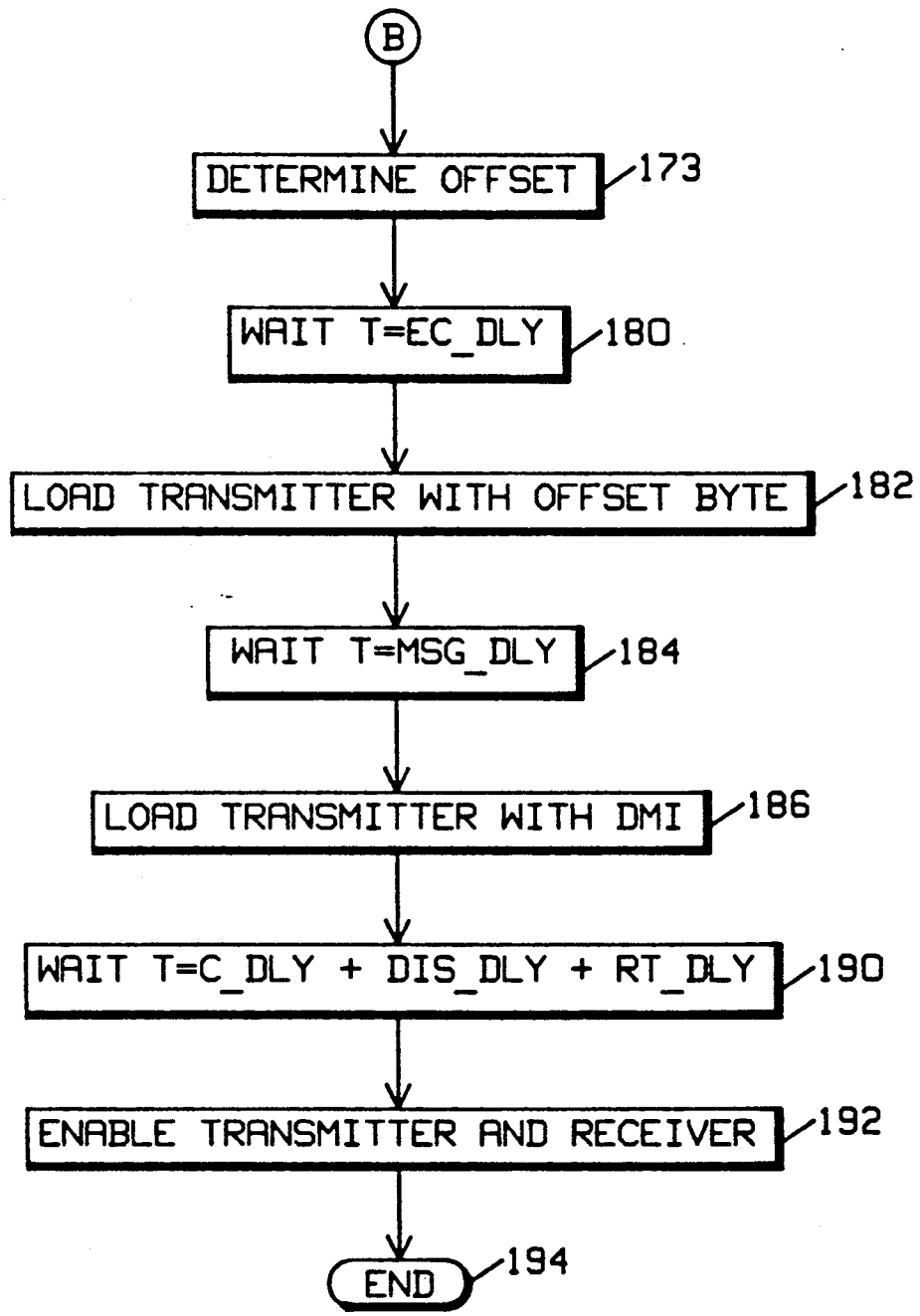

The operation of the answering DSU 34 is described in conjunction with the flow chart of FIG. 4 which starts at step 150. At 152, the transmit register is loaded with Control Mode Idle (CMI) as defined by the network specifications. Then, the receiver is synchronized to the bytes of CMI or other BiPolar Violation (BPV) sequences received from the network in a known manner at step 156. The answering DSU 34 then waits for an Off Hook signal from the network at 158. When this is received, the transmit register is loaded with Data Mode Idle (DMI) at 160 which is transmitted for up to a time period defined in step 164 as the synchronization timeout (SYNC_TO) period. If this time period expires at step 172, the routine transfers control to error handling routines at step 172. If a valid sync signal is received at 174 prior to expiration of the timer at 170, control passes to step 178. Step 174 loops back to step 170 until either the timer expires at 170 or the valid sync signal is received at 174.

At step 178, the time offset of the received sync signal is ascertained by looking at the location of the logic one in the sync patterns which are received. Eighty such patterns are sequentially transmitted and may, for example, be a 1000000 pattern in the preferred embodiment. In general, the idea is to transmit a large number of patterns for reliability and the receiver looks for a smaller number (e.g. 10) to ascertain the proper byte boundary. In this case, the location of the 1 in the consecutive sync patterns determines the position of the first bit in the byte so that byte boundaries can be determined. Those skilled in the art will recognize that numerous other sync patterns could be used, for example, 0000001 or 1111110 could be used to establish the byte boundaries.

The answering DSU 34 then waits for a delay equivalent to the echo canceller delay (EC_DLY) at step 180. Then, the transmitter is loaded with the offset byte at 182 which is a byte of information transmitted back to the originating DSU 14 to let it know how much offset is present in its transmitted sync signal. The originating DSU 14 uses this offset to adjust its transmit byte boundary for transmission of the echo canceller disable tone (or other network control message). This offset byte is repeated 80 times at step 184 which waits for a period equal to the message delay (MSG_DLY) which is likely on the order of 10 ms in the preferred embodiment. During this delay, since no new bytes are loaded into the transmit register, the offset byte is repeatedly transmitted until the end of the delay. In general, the idea is to transmit a large number of patterns for reliability and the receiver looks for a smaller number.

At step 186, the transmitter is loaded with DMI which is transmitted for a period of time equal to the echo canceller delay (EC_DLY) plus the time associated with the duration of the disable tone (DIS_DLY) plus the round trip delay (RT_DLY) at step 190. Finally the transmitter and receiver are enabled to receive user data at step 192 and the routine exits at 194.

The various delays used in the preferred embodiment suitable for disabling echo cancellation in the U.S. Sprint digital network are summarized in TABLE 2 below:

TABLE 2

| DELAY | TIME/EXPLANATION |
|---|---|
| CALL SETUP PERIOD | APPROX. 3½-4 SEC. - DETERMINED BY NETWORK - TIME DURING WHICH DATA IS MAPPED TO VIOLATION CODES |
| MSG_DLY | APPROX. 10 ms - TIME PERIOD SYNC OR OFFSET MESSAGE IS TRANSMITTED |
| OFFSET_TO | RT_DLY + PROCESSING DLY = 150 ms + 50 ms = APPROX. 200 ms - TIME ORIGINATING STATION WAITS FOR OFFSET MESSAGE |
| PROCESSING _DLY | APPROX. 50 ms - MAXIMUM TIME REQUIRED TO PROCESS A RECEIVED MESSAGE |
| RT_DLY | APPROX. 150 ms - MAXIMUM NETWORK ROUND TRIP DELAY. 2X PROPAGATION DELAY FROM ANSWER TO ORIGINATE CPE |
| SYNC_TO | RT_DLY + PROCESSING_DLY = 150 ms + 50 ms = APPROX. 200 ms - TIME ANSWERING STATION WAITS FOR SYNC MESSAGE |
| SU_DLY | APPROX. 50 ms - TIME FOR ANSWER UNIT TO ENABLE (SETUP) RECEIVER BEFORE ORIGINATE UNIT TRANSMITS FIRST USER DATA |
| DIS_DLY | APPROX. 300 ms - DURATION OF TRANSMISSION OF ECHO CANCELLER DISABLE TONE |
| EC_DLY | APPROX. 25 ms - DELAY INTRODUCED TO ALLOW FOR THE ECHO CANCELLER TO DISABLE AFTER THE TONE IS RECEIVED |

Figure 5:
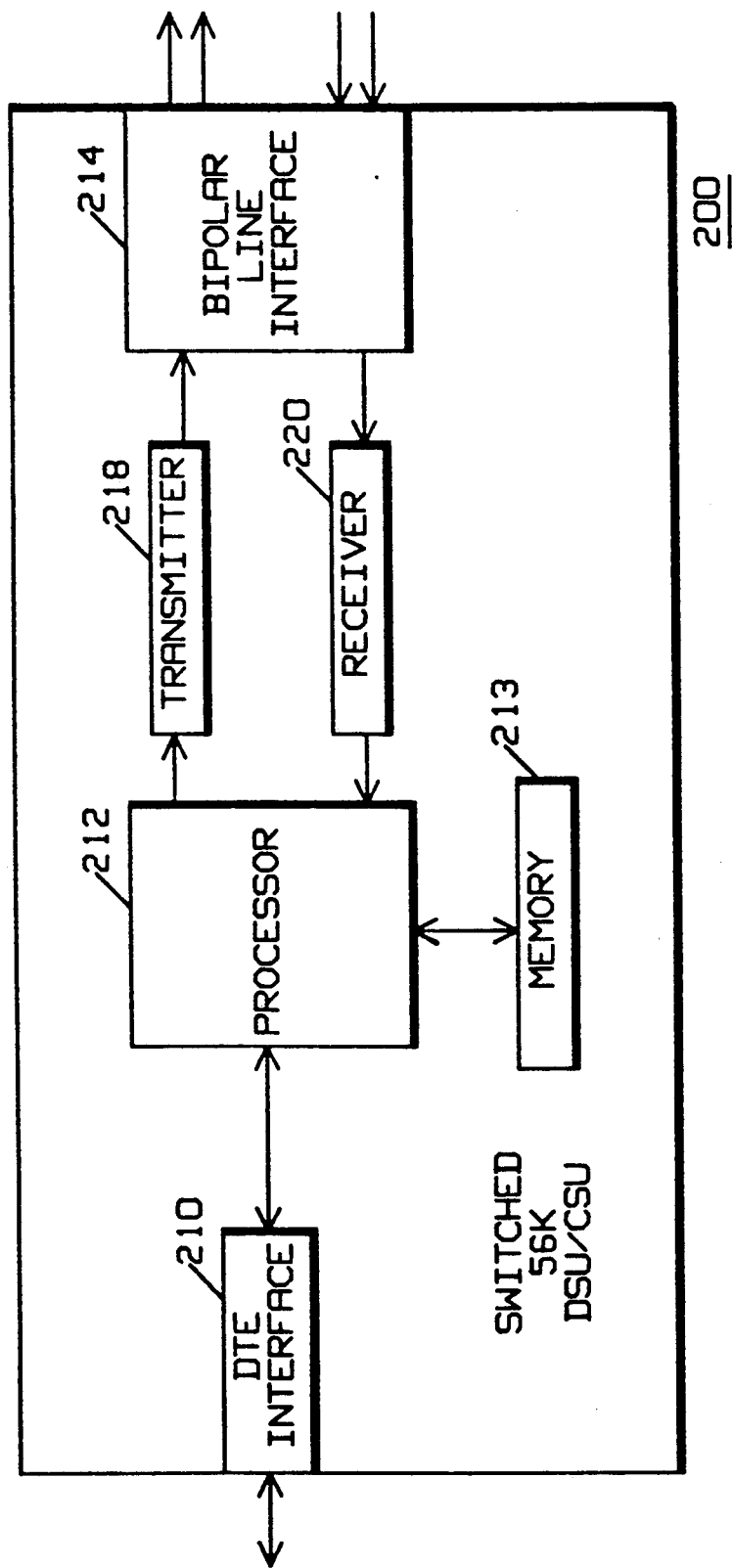
FIG. 5 shows a block diagram of a DSU/CSU according to one embodiment of the present invention.

FIG. 5 shows a switched 56K DSU/CSU 200 according to the present invention. Most such devices are similar in design in that they have an interface to the data terminal equipment 210 on one side which provides connection to an RS-232 or similar computer connection which converts signals to levels usable by an internal programmed processor 212 with its associated memory 213 (which stores the 2100 Hz tone table). In addition, the control lines of the DTE interface are monitored and control signals are passed on to the processor 212 as required.

On the other side of the DSU/CSU 200 is an interface to a four wire local loop transmission line 214. This interface receives data from a transmitter 218 and formats it for transmission over the local loop. Similarly, the line interface 214 receives signals from the local loop and converts them to appropriate levels for processing by a receiver 220. The transmitter 218 receives signals to transmit from processor 212. The receiver 220 forwards signals from the local loop to the processor 212 which forwards them to the DTE interface 210 when appropriate or acts upon them as appropriate in the case of control signals and the like.

Figure 6:
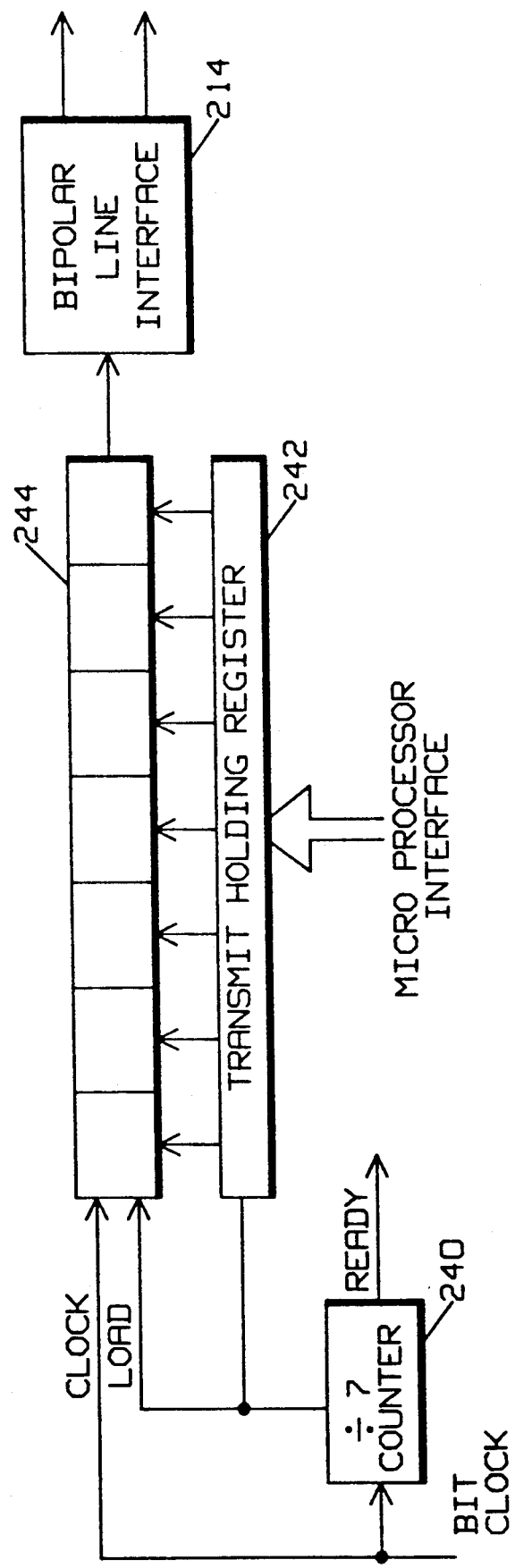
FIG. 6 shows a hardware implementation of a portion of the transmitter of FIG. 5.

In the preferred embodiment, the processor 212 is programmed to operate in accordance with the flow charts of FIGS. 2-4 in order to implement the present invention. The transmit register may be internal to a microprocessor forming the heart of the processor 212, or may be a discrete device as shown in FIG. 6. In this FIGURE, the bit clock, which is derived from the data on the transmission line, is divided by 7 (since there are seven bits in a byte in the current embodiment) by a divide by 7 counter 240. This divided clock signal is used to trigger loading of a byte from a transmit holding register 242 into the transmit register 244. The byte in this transmit register 244 is then clocked out serially by the bit clock into the line interface 214 which converts the logic level signal into appropriate bipolar signals for transmission over the local loop.

The transmit holding register is loaded periodically as required by the microprocessor of processor 212 which also receives a "ready" signal from the counter 240. If the transmit holding register is not loaded again by the microprocessor by the end of the bit period following the "ready" signal, then the previous byte is loaded again into the transmit register, thus facilitating repeated transmission of the same byte, e.g. DMI, CMI, sync or offset bytes can be repeatedly transmitted in this manner.

Figure 7:
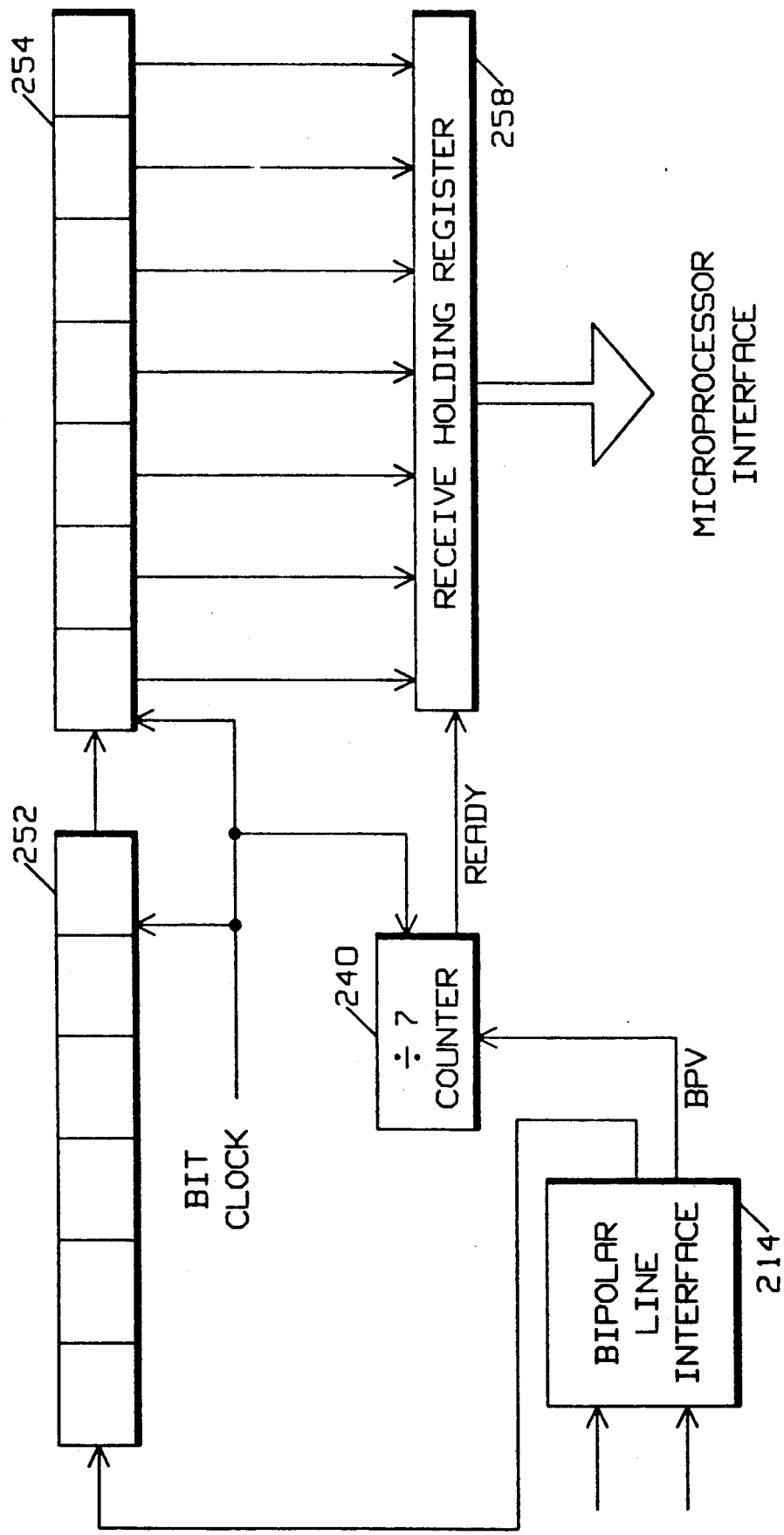
FIG. 7 shows a hardware implementation of a portion of the receiver of FIG. 5.

A similar process takes place in the receiver as described by FIG. 7. This embodiment of the receiver uses two stages of shift registers 252 (6 bits wide) and 254 (7 bits wide), in conjunction with a receive holding register 258 to transfer data into the microprocessor of processor 212. Data bits from the line interface 214 is serially clocked into the first shift register 252 by the bit clock. The bits continue to be shifted into the second stage 254 by the bit clock and are loaded into the receive holding register when counter 240 issues a "ready" (load) signal to the receive holding register. The counter counts down from 6 to 0 and issues the "ready" signal when the count equals 0. The counter then resets.

When the receiver is set up to synchronize with the network's bipolar violation control sequences, a BPV sequence causes the timing counter to be forced to a 6 such that in seven more bit times the seven bits representing the BPV sequence will be loaded into the receive holding register. The receiver will now be synchronized and a flywheel effect will cause the 7 bits following the BPV sequence to be holding register 258 7 bit times later. The subsequent bytes will be likewise loaded. If more BPV control sequences are received, they will only cause an adjustment to this flywheel effect if the 7 bit BPV sequence is not received 7 bit times, or an exact multiple of 7 bit times, after the previously received BPV, i.e. if it is not received on the established byte boundary.

The SPRINT network operates somewhat different from many other commercially available networks during the call setup stage. During this stage, the data sent by the OCU to the DSU is altered by a mapping of the received signal to violation codes to distinguish this signal from data. This time period is used in call progress tone decoding (e.g. busy; ringing; etc.). During this time period the sync and offset signals of the present invention cannot get through unaltered so the system waits for the call setup period delay period. In other networks which do not have this characteristic, this wait may be omitted. In such networks, the present invention will ascertain the proper byte boundaries more quickly.

Many variations can be made to the present inventions while keeping with the principles disclosed herein. For example, the echo canceller disable tone could be transmitted by the answering unit in another embodiment. In other embodiments, different synchronization patterns could be transmitted to locate the boundaries of the network bytes. The offset message can take on any number of forms as long as the proper information is conveyed and other hardware or software implementations can be used without departing from the present invention.

Thus it is apparent that in accordance with the present invention, an apparatus that fully satisfies the objectives, aims and advantages is set forth above. While the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the scope of the appended claims.

What is claimed is:

1. In a digital data communication network having an echo canceller situated in a portion thereof, said network imposing a byte structure with byte boundaries upon data transmitted thereon, a method for disabling said echo canceller so that the echo canceller will not interfere with transmission of digital signals over the network, the method comprising the steps of:
   at an originating station, transmitting a digital synchronization byte having byte boundaries to an answering station;
   at said answering station, receiving said synchronization byte and comparing the byte boundaries of said synchronization byte with said network byte boundaries;
   at said answering station, determining a time offset required to align the byte boundaries of said synchronization byte with said network byte boundaries and transmitting said offset time in the form of an offset signal to said originating station;
   at said originating station, receiving said offset signal, and adjusting transmission time of transmitted bytes having byte boundaries transmitted by said originating station so that the network byte boundaries aligns with said transmitted byte boundaries when said transmitted bytes are received by said answering station and said network; and
   at said originating station, transmitting an echo canceller disabling signal with byte boundaries which are in time alignment with said network byte boundaries to disable said echo canceller.

2. The method of claim 1, wherein said step of transmitting an echo canceller disabling signal comprises transmitting a sequence of digital samples of a 2100 Hz tone for a duration adequate to disable said echo canceller.

3. The method of claim 2, further comprising the step of retrieving said sequence of digital samples from a memory table.

4. In a digital data communication network having an echo canceller situated in a portion thereof, said network imposing a byte structure with byte boundaries upon data transmitted thereon, a method for disabling said echo canceller so that the echo canceller will not interfere with transmission of digital signals over the network, the method comprising the steps of:
   transmitting a digital synchronization byte having byte boundaries from an originating station to an answering station;
   receiving an offset signal from said answering station and adjusting transmission time of transmitted bytes transmitted by said originating station so that the network byte boundaries align in time with said transmitted byte boundaries when said transmitted bytes are received by said answering station and said network; and
   transmitting an echo canceller disabling signal over said network, said echo canceller disabling signal having byte boundaries which are in time alignment with said network byte boundaries, to disable said echo canceller.

5. The method of claim 4, wherein said step of transmitting an echo canceller disabling signal comprises transmitting a sequence of digital samples of a 2100 Hz tone for a duration adequate to disable said echo canceller.

6. The method of claim 5, further comprising the step of retrieving said sequence of digital samples from a memory table.

7. In a digital data communication network, a method for determining byte boundaries of said network, the method comprising the steps of:
   receiving a synchronization byte from an originating station and comparing said synchronization byte with known network byte boundaries;
   determining an offset required to align said synchronization byte with said known network byte boundaries; and
   transmitting said offset in the form of an offset signal to said originating station.

8. The method of claim 7, further comprising the step of transmitting a message from said originating station which is aligned to the network byte boundary.

9. A telecommunication system comprising:
   a bit-synchronous digital transmission network which imposes a byte structure having byte boundaries upon data transmitted over said network;
   an echo canceller coupled to said transmission network, said echo canceller including means responsive to a predetermined disable signal received in synchronous data frames for disabling said echo canceller;
   locating means, coupled to said transmission network for ascertaining a location in time of said byte boundaries of said network; and
   transmitting means, responsive to said locating means and coupled to said network, for transmitting said disable signal to said echo canceller in synchronous data frames aligned in time with said byte boundaries.

10. The apparatus of claim 9, wherein said transmitting means transmits an echo canceller disabling signal comprising a sequence of digital samples of a 2100 Hz tone.

11. The apparatus of claim 10, further comprising retrieving means for retrieving said sequence of digital samples from a memory table.

12. The apparatus of claim 11, wherein said table includes samples from 21 cycles of said 2100 Hz tone.

13. The apparatus of claim 11, wherein said memory table includes 80 samples of said 2100 Hz tone and wherein said retrieving means repeatedly retrieves said 80 samples to produce a disabling signal of a predetermined duration.

14. The apparatus of claim 13, wherein said 80 samples are retrieved 30 times.

15. The apparatus of claim 9, wherein said locating means comprises:

means for transmitting a synchronization signal from a first station to a second station;

determining means for determination of said byte boundaries at said second station by comparison of said synchronization signal with a reference signal from said network; and means for transmitting an offset signal from said second station to said first station for adjusting the byte boundaries of bytes transmitted by said first station.

16. The apparatus of claim 15, wherein said offset signal is a one byte digital signal indicating the number of bit times to shift the transmitter timing.

17. The apparatus of claim 16, wherein said offset signal is transmitted repeatedly to assure reliable receipt.

18. The apparatus of claim 15, wherein said determining means includes means for finding the number of bit times difference between said network byte boundaries and the transmitted byte boundaries of the synchronization signal.

19. A telecommunication system comprising:

a bit-synchronous digital transmission network which imposes a byte structure having byte boundaries upon data transmitted over said network;

an echo canceller within said transmission network, said echo canceller including means responsive to a predetermined disable signal received in synchronous data frames for disabling said echo canceller;

locating means, coupled to said transmission network, for ascertaining a location in time of said byte boundaries of said network, said locating means comprising means for transmitting a synchronization signal from a first station to a second station, determining means for determination of said byte boundaries at said second station by comparison of said synchronization signal with a reference signal from said network, and means for transmitting a one byte offset signal from said second station to said first station, said one byte offset signal containing information used to adjust transmission times of bytes transmitted by said first station to align the byte boundaries of said transmitted bytes in time with said network byte boundaries;

said determining means including means for finding the number of bit times difference between a known receive byte boundaries and the transmitted byte boundaries of the synchronization signal;

transmitting means, responsive to said locating means and coupled to said network, for transmitting said disable signal, comprising a sequence of digital samples of a 2100 Hz tone, to said echo canceller in synchronous data frames aligned in time with said byte boundaries;

said transmitting means further comprising retrieving means for retrieving said sequence of digital samples from a memory table 30 consecutive times, said table including 80 samples from 21 cycles of said 2100 Hz tone.

* * * * *